(12) United States Patent
Zhong

(10) Patent No.: US 10,101,039 B2
(45) Date of Patent: Oct. 16, 2018

(54) MODULAR FLOORING

(71) Applicant: Yugang Zhong, Liaoning (CN)

(72) Inventor: Yugang Zhong, Liaoning (CN)

(*) Notice: Subject to any disclaimer, the term of this patent is extended or adjusted under 35 U.S.C. 154(b) by 0 days.

(21) Appl. No.: 15/035,381

(22) PCT Filed: Aug. 26, 2014

(86) PCT No.: PCT/CN2014/085194
§ 371 (c)(1),
(2) Date: May 9, 2016

(87) PCT Pub. No.: WO2015/070657
PCT Pub. Date: May 21, 2015

(65) Prior Publication Data
US 2016/0290659 A1    Oct. 6, 2016

(30) Foreign Application Priority Data

Nov. 12, 2013  (CN) .......................... 2013 1 0562290
Nov. 12, 2013  (CN) ..................... 2013 2 0713753 U

(51) Int. Cl.
*F24D 3/14*    (2006.01)
*E04F 15/02*   (2006.01)
*E04F 15/024*  (2006.01)

(52) U.S. Cl.
CPC .......... *F24D 3/14* (2013.01); *E04F 15/02038* (2013.01); *E04F 15/02194* (2013.01); *E04F 15/02411* (2013.01); *E04F 2290/023* (2013.01)

(58) Field of Classification Search
CPC .............. E04F 15/02194; E04F 15/024; E04F 15/02405; E04F 15/20447; E04F 15/0247; E04F 15/02038; F24D 3/14; F24D 5/10
See application file for complete search history.

(56) References Cited

U.S. PATENT DOCUMENTS 4,893,441 A    1/1990  Catalano et al.
6,092,587 A *  7/2000  Ingram .................... F24D 3/14
                                                        165/171
(Continued)

FOREIGN PATENT DOCUMENTS

CN         1256343 A     6/2000
CN       201581598 U     9/2010
(Continued)

*Primary Examiner* — Robert Canfield
(74) *Attorney, Agent, or Firm* — Muncy, Geissler, Olds & Lowe, P.C.

(57) ABSTRACT

Provided is a modular flooring, including a fixed frame which is internally provided with a plurality of unit boards, wherein the unit boards include long boards and short boards, and the short boards are shorter than the long boards; the long boards and the short boards are arranged in a transverse row of long and short boards, a plurality of long boards are arranged in a transverse row of long boards, the transverse row of long boards and the transverse row of long and short boards are vertically spaced, and the long boards in the transverse row of long and short boards and the long boards in the transverse row of long boards are vertically staggered; both the long boards and the short boards are made up of a frame and a panel, and props are fixed on the bottom of the rectangular frame.

3 Claims, 2 Drawing Sheets

(56) References Cited

U.S. PATENT DOCUMENTS

| | | | |
|---|---|---|---|
| 6,550,195 B1* | 4/2003 | Cooper | E04B 5/48 52/126.3 |
| 9,038,324 B2* | 5/2015 | Kugler | E04F 15/02464 52/126.6 |
| 2003/0177728 A1* | 9/2003 | Ku | E01C 5/223 52/403.1 |
| 2004/0075042 A1* | 4/2004 | Arozena Bergaretxe | E04G 11/486 249/210 |
| 2008/0052824 A1* | 3/2008 | Stoltzfus | A47C 17/40 5/136 |
| 2009/0249732 A1* | 10/2009 | Bly | E04F 15/105 52/588.1 |
| 2010/0275535 A1* | 11/2010 | Gard | E04C 2/42 52/177 |
| 2012/0240500 A1* | 9/2012 | Bjorkman | E04B 5/48 52/302.1 |
| 2014/0123576 A1* | 5/2014 | Meyer | E04F 15/02452 52/126.6 |
| 2015/0121786 A1* | 5/2015 | Carr | E04C 1/392 52/302.1 |

FOREIGN PATENT DOCUMENTS

| | | | |
|---|---|---|---|
| CN | 201605778 U | 10/2010 | |
| CN | 102864900 A | 1/2013 | |
| CN | 103015669 A | 4/2013 | |
| CN | 203230140 U | 10/2013 | |
| CN | 103572939 A | 2/2014 | |
| CN | 203626188 U | 6/2014 | |
| EP | 3075922 A1 * | 10/2016 | ........ E04F 15/02194 |
| GB | 1316769 A * | 5/1973 | ............. E04G 9/02 |
| JP | 2003227198 A * | 8/2003 | |
| JP | 4896432 B2 * | 3/2012 | |
| JP | 2013068054 A | 4/2013 | |
| WO | 2009152894 A1 * | 12/2009 | ............ E04F 15/024 |
| WO | 2014125553 A1 * | 8/2014 | ........ E04F 15/02188 |

* cited by examiner

MODULAR FLOORING

BACKGROUND OF THE INVENTION

1. Field of the Invention

The present invention belongs to the technical field of white steel weldment and woodworking furniture, and particularly relates to a modular flooring which is an environment-friendly easy-to-maintain flooring made according to thermal and mechanical principles.

2. The Prior Arts

At present, the existing wood flooring provided on radiant floor is easy to deform and has poor heat conduction effect, the existing composite flooring contains hazardous substances such as formaldehyde, and both of the existing floorings are inconvenient to maintain and disassemble. In addition, both of the existing floorings are provided directly on the ground or radiant floor and have poor comfort.

SUMMARY OF THE INVENTION

Aiming at the defects of the prior art, the present invention provides a modular flooring which is provided indoors, has the characteristics of easy disassembly and replacement, convenient maintenance, environmental protection, beautiful appearance, comfort, good heat conduction effect, no easy deformation, etc., and also saves materials and human resources required for leveling with cement during pavement of floorings of other types.

The purpose of the present invention is achieved by the following technical schemes: a modular flooring, including a first frame; the first frame is internally provided with a plurality of unit boards, and the first frame and a unit board are in the same plane; the unit boards include long boards and short boards, and the short boards are shorter than the long boards; at least one long board and the short boards are arranged in a transverse row of long and short boards, the short boards are arranged on both ends of the transverse row of long and short boards, a plurality of long boards are arranged between the short boards, and the width of the transverse row of long and short boards is the same as that of the long boards; the short boards and the long boards in the same transverse row of long and short boards have the same width; a plurality of long boards are arranged in a transverse row of long boards, and the width of the transverse row of long boards is the same as that of the long boards; a prop is fixed on one side of each short board adjacent to the transverse row of long boards, props are disposed between the long boards in the transverse row of long and short boards, and each prop is arranged on one side of each long board in the transverse row of long and short boards adjacent to the transverse row of long boards; if there is only one long board in the transverse row of long and short boards, then the long board is not provided with a prop; props are disposed between the long boards in the transverse row of long boards, and each prop is arranged on one side of each long board in the transverse row of long boards adjacent to the transverse row of long and short boards; each unit board is made up of a rectangular frame, lifting support legs and a panel, a gap is formed between two adjacent rectangular frames, the lifting support legs of each unit board are fixed on four corners of a bottom of the rectangular frame thereof, the panel of each unit board is fixed on a top of the rectangular frame thereof, and adjacent panels are in close contact; each prop is fixed on the bottom of the rectangular frame and protrudes from the bottom edge of the rectangular frame.

Heat radiation holes are formed in the panels.

The middle parts of the rectangular frames of the long boards are provided with a plurality of connecting rods.

Triangular sheets with through holes are fixed on the four corners of the rectangular frame, and the panel of each unit board is fixed on the rectangular frames thereof via the through holes of the triangular sheets.

The first frame and the panels are all made of environment-friendly material.

The first frame and the panels are all finger-jointed.

The lifting support legs adopt lifting bolts.

A second frame is arranged in the first frame and between the first frame and the unit boards.

The second frame is L-shaped or rectangular.

Heat radiation holes are formed in the second frame.

The present invention has the following beneficial effects:

The present invention can be provided indoors, has the characteristics of easy disassembly and replacement, convenient maintenance, environmental protection, beautiful appearance, comfort, good heat conduction effect, no easy deformation, etc., and also saves materials and human resources required for leveling with cement during assembly of floorings of other types.

Figure 1:
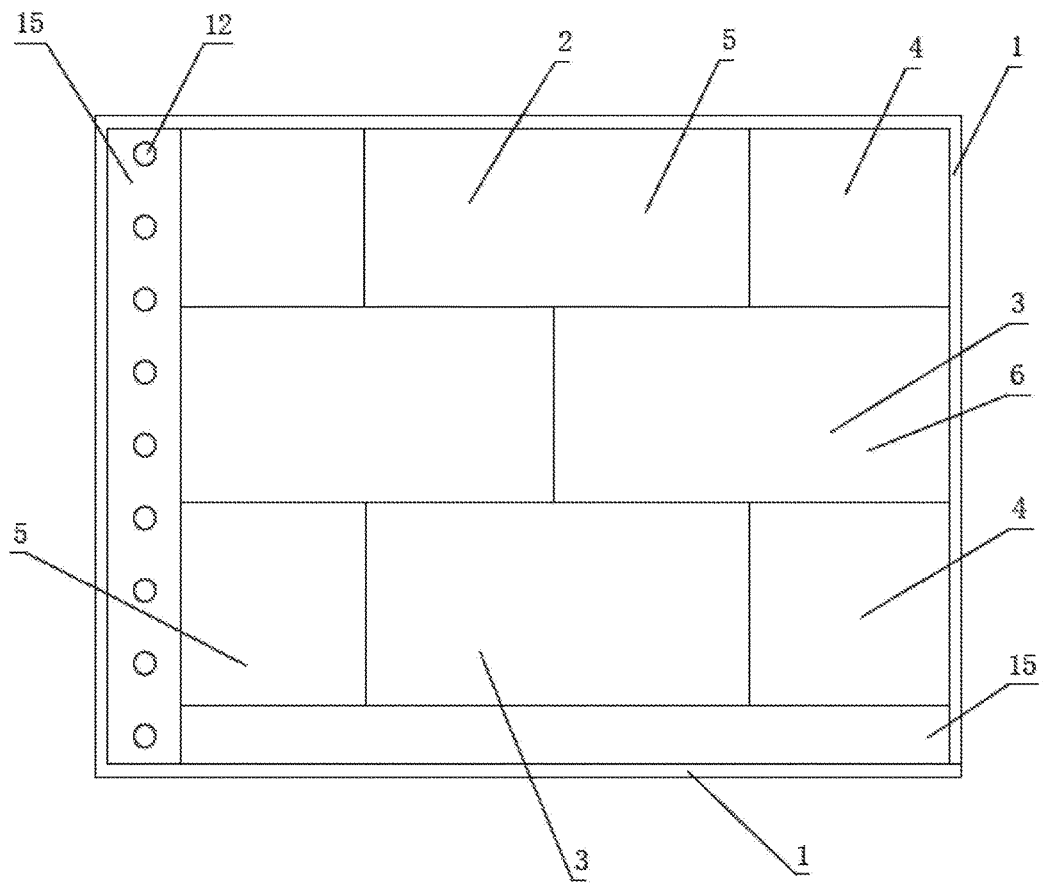
FIG. 1 is a structural diagram of the modular flooring of the present invention from a top view.

These figures show first frame 1, unit board 2, long board 3, short board 4, transverse row 5 of long and short boards, transverse row 6 of long boards, prop 7, panel 9, rectangular frame 10, lifting support leg 11, heat radiation hole 12, connecting rod 13, triangular white steel sheet 14, a L-shaped second frame 15, a first frame body 16, a second frame body 17, a third frame body 18, a fourth frame body 19, a fifth frame body 20, a sixth frame body 21, a seventh frame body 22 and an eighth frame body 23.

DETAILED DESCRIPTION OF THE PREFERRED EMBODIMENT

The present invention is further described in combination with the figures and embodiments.

Figure 2:
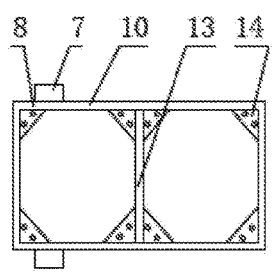
FIG. 2 is a structural diagram of the frame of the long board with props from a bottom view.
Figure 3:
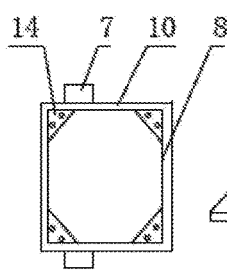
FIG. 3 is a structural diagram of the frame of the short board with props from a bottom view.
Figure 4:
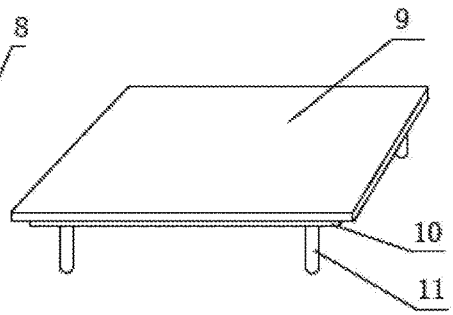
FIG. 4 is a perspective structural diagram of the unit board of the present invention.
Figure 5:
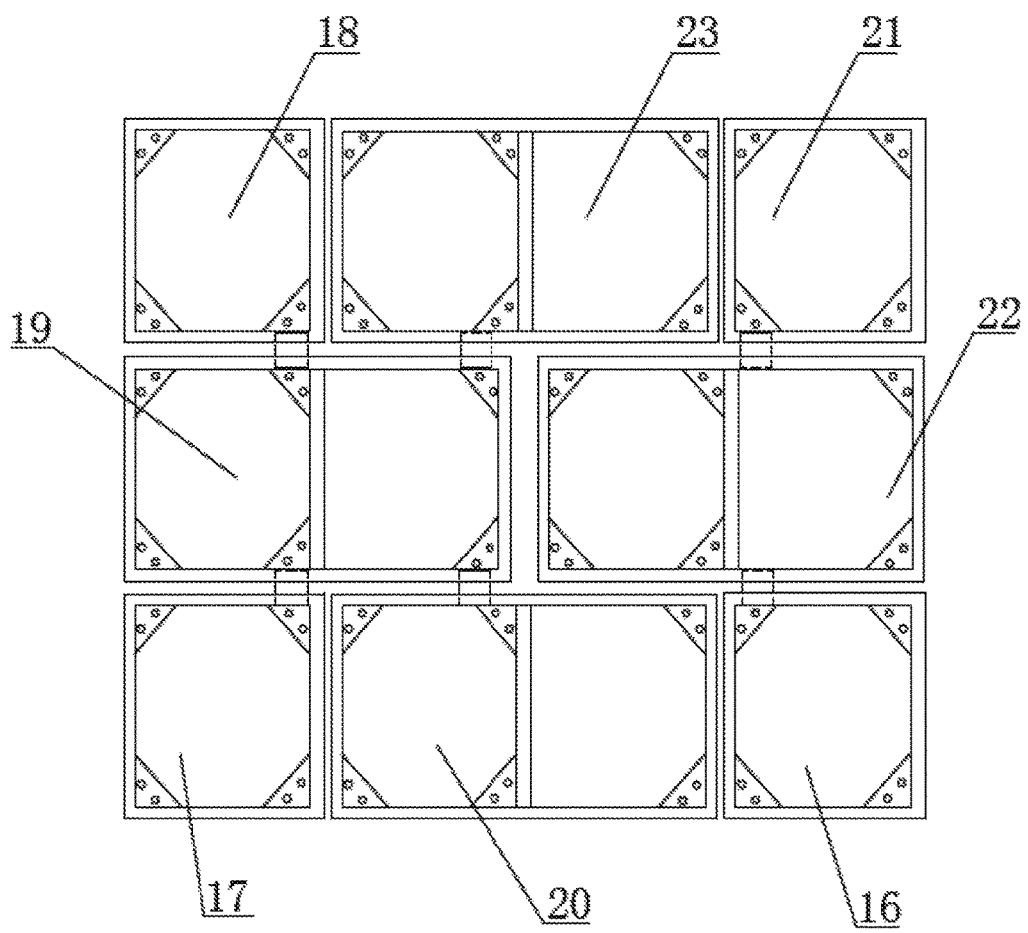
FIG. 5 is a structural diagram of the assembled frame of the present invention from a bottom view.

As shown in FIGS. 1 to 5, a modular flooring includes an enclosed first frame 1, the first frame 1 is internally provided with a plurality of unit boards 2, and the upper surfaces of the first frame 1 and a unit board 2 are in the same plane; the unit boards 2 include long boards 3 and short boards 4, and the length of the short boards 4 is half of that of the long boards 3; the long boards 3 and the short boards 4 are arranged in a transverse row 5 of long and short boards, the short boards 4 are arranged on both ends of the transverse row 5 of long and short boards, the long boards 3 are arranged between the short boards 4, and the width of the transverse row 5 of long and short boards is the same as that of the long boards 3; the short boards 4 and the long boards 3 in the same transverse row 5 of long and short boards have the same width; two long boards 3 are arranged in a transverse row 6 of long boards, and the width of the transverse row 6 of long boards is the same as that of the long boards 3; a prop 7 is fixed on one side of each short board 4 adjacent to the transverse row 6 of long boards to support the adjacent transverse row 6 of long boards; if there is only one long board 3 in a transverse row 5 of long and short boards, then the long board 3 is not provided with a prop 7 by welding; props 7 are disposed between the long boards 3 in the transverse row 6 of long boards, and each prop 7 is arranged on one side of each long board 3 in the transverse row 6 of long boards adjacent to the transverse row 5 of long and short boards to support the middle part of the adjacent unit board 2, which can keep the upper surfaces of the unit boards 2 in the same plane, prevent the adjacent unit board 2 from subsidence due to load, and let the unit boards 2 to be taken out in order when the flooring needs maintenance or removal; each unit board 2 is made up of a rectangular frame 10, lifting support legs 11 and a panel 9, a gap is formed between two adjacent rectangular frames 10 (see FIG. 5), the lifting support legs 11 of each unit board 2 are fixed on four corners of a bottom of the rectangular frame 10 thereof to adjust the height of the rectangular frame 10, the panel 9 of each unit board 2 is fixed on a top of the rectangular frame 10 thereof, the area of the upper surface of the panel 9 of each unit board 2 is larger than that of the upper surface of the rectangular frame 10 thereof, and adjacent panels 9 are in close contact; each prop 7 is fixed on the bottom of the rectangular frame 10 and protrudes from the bottom edge of the rectangular frame 10, and each prop 7 is 10 cm long, 4 cm wide and 2 cm high, wherein the part protruding from the bottom edge of the rectangular frame 10 is 2.5 cm long; to adapt to different assembling areas, different transverse rows 5 of long and short boards 3, 4 can be in different widths, and different transverse rows 5 of long and short boards 3, 4 can be in different lengths; different transverse rows 6 of long boards 3 can be in different widths, and different transverse rows 6 of long boards 3 can be in different lengths.

If the flooring is disposed on radiant floor, then heat radiation holes 12 with the diameter of 3 cm are formed in the panels 9.

The rectangular frame 10 of the long board 3 is 160 cm long and 80 cm wide.

The rectangular frame 10 of the short board 4 is 80 cm long and 80 cm wide.

The rectangular frame 10 is made of square white steel tubes by welding.

The middle parts of the rectangular frames 10 of the long boards 3 are provided with one or two connecting rods 13 to increase the bearing capacity of each rectangular frame 10.

Triangular white steel sheets 14 with through holes are fixed on the four corners of the rectangular frame 10 of each unit board 2, and the panel 9 of each unit board 2 is fixed on the rectangular frames 10 thereof via the through holes of the triangular white steel sheets 14.

The lifting support legs 11 of each unit board 2 are symmetrically fixed on the bottom of the four corners of the rectangular frame 10 thereof by welding.

The lifting support legs 11 of each unit board 2 adopt lifting bolts with the height of 10 cm.

An L-shaped second frame 15 is arranged in the first frame 1, and fixed between the first frame 1 and the unit board 2.

If the flooring is arranged on radiant floor, then heat radiation holes 12 with the diameter of 3 cm are formed in the second frame 15.

The first frame 1, the panels 9 of each unit board 2 and the second frame 15 are all made of environment-friendly material.

The first frame 1, the panels 9 of each unit board 2 and the second frame 15 are all finger-jointed.

The pavement process of the present invention is described in combination with the figures.

As shown in FIGS. 1 to 5, when the flooring is assembled, the rectangular frames are firstly disposed in the order from the first frame body 16 to the eighth frame body 23 the height can be adjusted by the lifting support legs 11, the upper surfaces of the adjusted rectangular frames 10 are in the same plane, and the panels 9 are fixed on the rectangular frames 10; the first frame 1 has the width of 1.8 cm, and finally, the L-shaped second frame 15 is disposed in the first frame 1 to keep the upper surfaces of the first frame 1 and the second frame 15 in the same plane as the upper surfaces of the panels 9; a gap of 2 to 3 mm is formed between the outer side wall of the second frame 15 and the inner side wall of the first frame 1, and the inner side wall of the second frame 15 is in contact with the outer side wall of the unit board 2.

If the flooring needs assembly or maintenance, the second frame 15 is disassembled firstly, and then the rectangular frames 10 are disassembled in the order from the eighth frame 23 to the first frame 16; if one unit board 2 is damaged, only the damaged unit board 2 needs replacement, thus saving cost and providing convenience.

If the flooring is disposed on radiant floor, then heat radiation holes 12 are drilled in the second frame 15 or the panels 9 to enable radiant floor to fully radiate heat.

What is claimed is:

1. A modular flooring, comprising:
a first frame internally provided with a plurality of unit boards, wherein, the unit boards include long boards and short boards, and the short boards are shorter than the long boards; at least one long board and the short boards are arranged in a transverse row of long and short boards, and the width of the transverse row of long and short boards is the same as that of the at least one long board; the short boards and the at least one long board in the same transverse row of long and short boards have the same width; a plurality of long boards are arranged in a transverse row of long boards, and the width of the transverse row of long boards is the same as that of the long boards; each unit board is comprised of a rectangular frame, lifting support legs and a panel, a gap is formed between two adjacent rectangular frames, the lifting support legs of each unit board are fixed on four corners of a bottom of the rectangular frame thereof, the panel of each unit board is fixed on a top of the rectangular frame thereof; a second frame is arranged between the first frame and the unit boards.

2. The modular flooring of claim 1, wherein middle parts of the rectangular frames of the long boards are provided with a plurality of connecting rods.

3. The modular flooring of claim 1, wherein heat radiation holes are formed in the second frame.

* * * * *